United States Patent Office 3,014,051
Patented Dec. 19, 1961

3,014,051
15β-HYDROXY ADRENO CORTICOIDS
William Charney, Bloomfield, Hershel L. Herzog, Mountain View, and David Sutter, Clifton, N.J., assignors to Schering Corporation, Bloomfield, N.J., a corporation of New Jersey
No Drawing. Filed Nov. 1, 1956, Ser. No. 619,693
6 Claims. (Cl. 260—397.45)

The present invention relates to the manufacture of steroid dienes, and in particular, 1,4-pregnadienes, which have a hydroxyl group in the beta-configuration at the 15-position.

It is an object of the invention to prepare 15β-hydroxysteroids which are characterized by useful therapeutic activity or are capable of conversion into compounds having such activity.

In particular, it is an object of the invention to prepare the 15β-hydroxy derivatives of cortisone, hydrocortisone, 4-pregnene-17α,21-diol-3,20-dione (Reichstein's Compound S), 4-pregnene-11α,17α,21-triol-3,20-dione, their respective delta-1 analogs and 21-esters.

The new compounds of our invention may be represented as steroids of the group consisting of

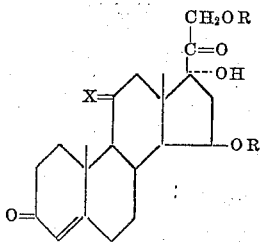

and

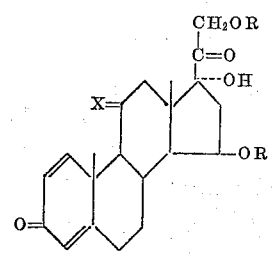

wherein X is a member of the group consisting of $H_2$, (H,αOH), (H,βOH) and O, and R is a member of the group consisting of H and lower alkanoic acid radicals.

The therapeutically useful compounds of the above formula are those wherein X represents H,βOH or O especially when accompanied by an additional double bond at C–1,2. These compounds are characterized by their ability to inhibit pituitary secretions and by their usefulness in the treatment of Cushing's syndrome and other adrenocortical hormonal disorders. The corresponding 4-pregnenes exhibit similar properties to a diminished extent and are therefore preferably categorized with those compounds of the general formula wherein X equals $H_2$ or (H,αOH) as being intermediates which are useful in the preparation of the aforementioned therapeutically useful substances.

The compounds of our invention may be prepared according to the following sequences:

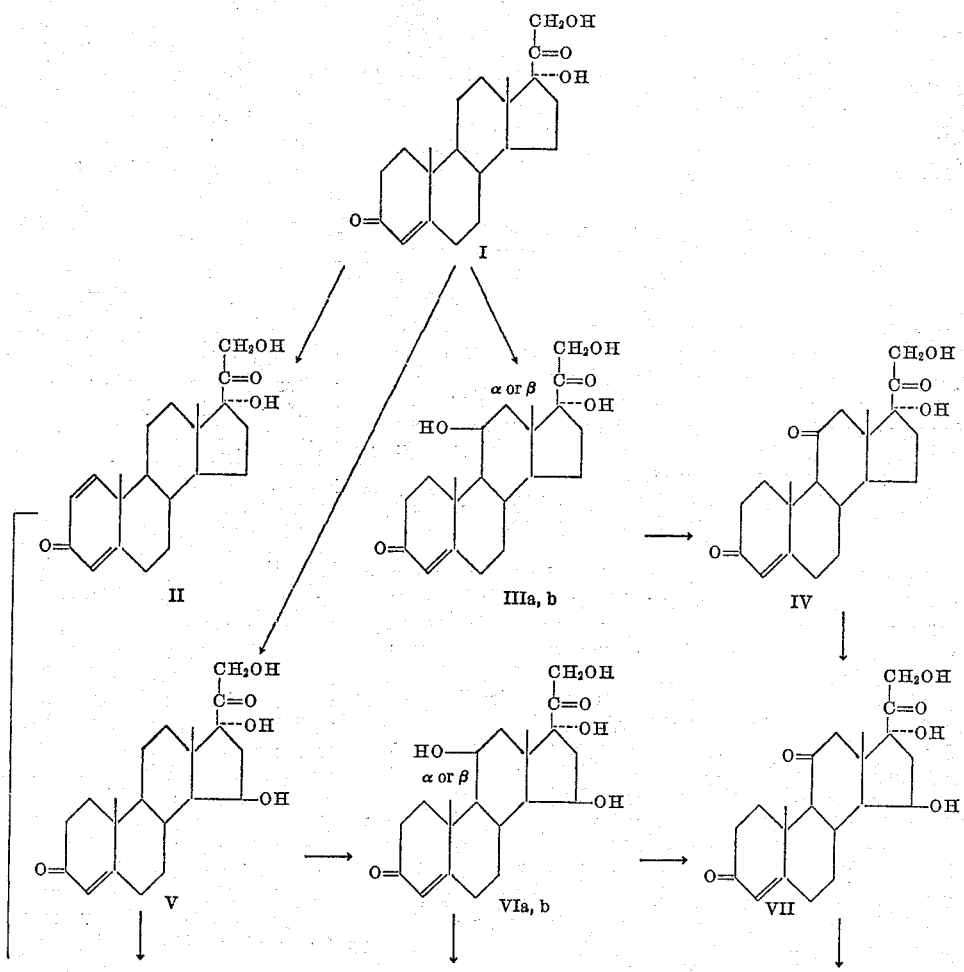

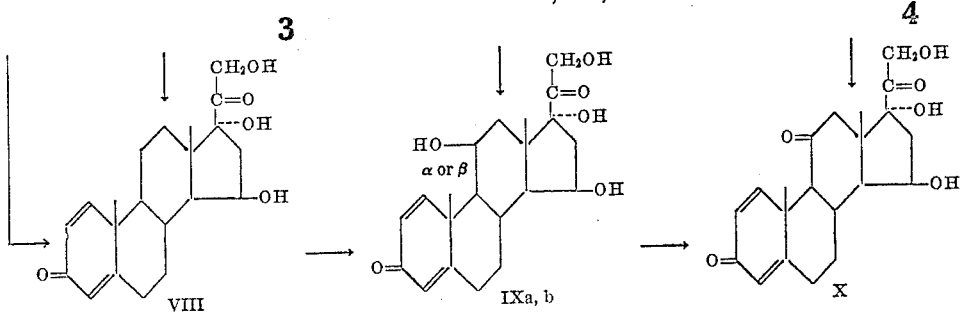

REACTIONS:
A. 11-hydroxylation, α or β
B. 11-oxidation
C. 15β-hydroxylation
L. Delta-1-dehydrogenation For the sake of brevity and clarity, all the reactants are shown to contain a free 21-hydroxy group and the products a free 15β-hydroxy group, although it is to be understood the 15β- and/or 21-ester react similarly. The esters may be prepared by simple esterification procedures as described in the examples. The starting materials are preferably 4-pregnene-17α,21-diol-3,20-dione (I), 1,4-pregnadiene-17α,21-diol-3,20-dione (II), 4-pregnene-11α,17α,21-triol-3,20-dione (IIIa), hydrocortisone (IIIb), or cortisone (IV), all of which are at least submitted to 15β-hydroxylation. The reaction scheme is indicative of the alternate methods of arriving at the preferred compounds of the invention. The sole limitation to the order of carrying out the various transformations is that the 15β-hydroxyl group is preferably introduced into a 11-oxygenated steroid prior to dehydrogenation of the A-ring, since we have found that reduction of the 1,2-bond occurs when an 11-oxygenated-1,4-pregnadiene is subjected to the action of the 15β-hydroxylating microorganism.

Thus, according to the equations, compound I may be hydroxylated in the 15β-position giving rise to 4-pregnene-15β,17α,21-triol-3,20-dione (V). Microbiological dehydrogenation of V according to procedures later described yields the diene VIII which may be hydroxylated in the 11-position according to known procedures, yielding IXa and IXb. Both IXa and IXb are convertible by selective oxidation of the 11-hydroxyl group into 1,4-pregnadiene-15β,17α,21-triol-3,11,20-trione (X).

Alternatively, compound I may be first dehydrogenated at the C-1.2-position yielding II which is transformed in turn to VII by 15β-hydroxylation. Similarly, one may start with IIIa, IIIb or IV which upon conversion to their respective 15β-hydroxyl analogs VIa, VIb and VII can be subjected to delta-1 dehydrogenation or other transformation indicated in the reaction scheme.

In all of the reaction sequences described above and in the schematic diagram, it is obvious that there are four or five transformations which may be performed, namely:

(a) 11-hydroxylation, α or β.
(b) Oxidation of an 11-hydroxyl group to an 11-keto.
(c) Introduction of a 15β-hydroxyl group.
(d) Introduction of a delta-1 bond.

As indicated heretofore, the order of carrying out a particular transformation may follow another depends merely on which compound of the invention is desired with the sole proviso that 15β-hydroxylation preceeds delta-1 dehydrogenation in an 11-oxygenated steroid.

All of the steps described in the schematic diagrams with the exception of the 15β-hydroxylation are known for analogous compounds and may be applied similarly. For example, the introduction of an 11α-hydroxyl group at any point described in the foregoing series of transformations is effected preferably by the action of a culture, or of the enzymatic material, or extract of Rhizopus nigricans in the manner described in U.S. Patent No. 2,602,769 dated July 8, 1952. Other 11α-hydroxylating organisms such as Aspergillus niger, Rhizopus arrhizus and the like may be used.

The introduction of the 11β-hydroxyl group is effected in like manner with the microorganism Curvularia lunata as described in U.S. Patent No. 2,658,023, dated November 3, 1953. Oxidation of an 11-hydroxyl group to an 11-keto group is conveniently performed at any of the steps designated by means of reagents such as chromic acid in pyridine as described by Poos et al., J.A.C.S. 75: 422 (1953). This procedure requires protective esterification of the 21-hydroxyl group, however, an 11-hydroxyl function may be oxidized in the presence of a free 21-OH group by means of agents such as N-bromsuccinimide and N-bromacetamide.

Dehydrogenation of the A-ring whereby a double bond is inserted at C-1,2 is preferably performed microbiologically utilizing Bacillus sphaericus (A.T.C.C. 7055) or Corynebacterium simplex (A.T.C.C. 6946), according to analogous procedures described in Belgian Patent 540,748. Subjecting a 4-pregnene to the dehydrogenating action of these organisms at any of the stages indicated in the reaction sequence according to the teaching of the Belgian patent yields the corresponding 1,4-pregnadiene.

We have found that a 15β-hydroxyl group may be introduced into steroids especially those containing substituents described heretofore by incubating or fermenting the steroid with a culture medium containing Bacillus megatherium, or the enzymatic extract thereof. Although various strains or variants of this microorganism will carry out the desired oxygenation, we prefer to use the strain identified as Bacillus megatherium (Isolate 41, Waksman Collection, Institute of Microbiology, Rutgers University, New Brunswick, New Jersey). A suitable nutrient medium containing organic nitrogen, co-factors and inorganic salts is necessary to obtain a desirable growth of Bacillus megatherium. After optimum growth, the cell mass may be conveniently separated by centrifuging the nutrient broth, decanting the supernatant liquid and suspending the cell mass so obtained in saline solution. A portion of the cell suspension may then be utilized as seed in a nutrient medium for supporting growth of the microorganism. The nutrient medium may be yeast extract (Difco), casein hydrolysate (N-Z-Amine), corn steep liquor, fish soulubles and the like. The steroid substrate as a solid, suspension, or solution in alcohol, acetone or other water-miscible solvent which is non-toxic towards the organism is, under sterile conditions, added to the growing microorganism in a broth medium. In order to promote the growth of the organism, the culture is shaken and aerated. The order of mixing the substrate with the organism is not critical for the steroid may be added to the broth medium and then inoculated with bacterium, or the growing bacterium may be added to the steroid in broth medium. Alternatively, enzyme preparations obtained from cultures of Bacillus megatherium may be used in our process. We prefer to cultivate the microorganism in a nutrient agar from which the seed culture is obtained and sub-culture in yeast extract and cerelose mixture at about 28°. We have further found that optimum growth is obtained after about 16 hours, and optimum transformation occurring 24 hours after addition of substrate. As indicated heretofore, any water-miscible solvent which is non-toxic to the organism may be employed to dissolve or suspend the steroid, however, we prefer to use ethanol in such quantities that the final concentration of solvent in the reaction mixture is less than about 5 percent.

The products of the reaction, after completion of the oxygenation, may be recovered by extraction with a suitable solvent by filtration, by adsorption on a suitable adsorbent or by other procedures commonly used in the art. For example, in extraction, chlorinated hydrocarbons, ketones and alcohols, such as chloroform, methylene chloride, butanol, diethylketone and the like may be used. Following extraction the products may be isolated by concentration of the extracts and purification accomplished by recrystallization from a suitable solvent, for example, acetone, acetone-hexane, methylene chloride, ethanol, etc. Where several products are formed in the same reaction, separation is conveniently accomplished by chromatography on adsorbents such as silica gel, alumina and the like.

The compounds of this invention may be administered parenterally in the form of therapeutically acceptable solutions and suspensions. Where oral administration is indicated, the substances may be easily compounded into tablets, elixirs and other common pharmaceutical dosage forms.

The following examples more fully describe the preparation of the compounds of this invention. However, they are presented for illustrative purposes only and in no way shall be construed as limiting the scope of this invention except as defined in the appended claims.

EXAMPLE 1

*4-pregnene-15β,17α,21-triol-3,20-dione*

A medium prepared from 10 g. of yeast extract (Difco) and 10 g. of cerelose is diluted to 1 liter with tap water and distributed equally among ten 300 ml. Erlenmeyer flasks. The flasks and contents are sterilized and each is inoculated with 1 ml. suspension of *Bacillus megatherium* (Isolate 41, Waksman Collection, Institute of Microbiology, Rutgers University, New Brunswick, N.J.) from a 24-hour broth culture on nutrient agar. The newly-seeded cultures are incubated and shaken on a shake table for 16 hours at 28° at 220 r.p.m. To each of the flasks is added, under sterile conditions, a solution of 25 mg. of 4-pregnene-17α,21-diol-3,20-dione in 0.5 ml. of 80% aqueous ethanol and fermentation is permitted to occur for an additional 24 hours while shaking. At the end of this period, paper chromatography according to the procedure of Shull, Abstracts of Papers at the 126th Meeting of the American Chemical Society, Sept. 12–17, 1954, N.Y., p. 9A, indicates the disappearance of the starting material and the formation of a single product which adsorbs in the U.V. and stains with red tetrazolium. The reaction mixture is extracted thoroughly with chloroform and the extracts are washed with water, dried and concentrated to a residue. The residue is crystallized and recrystallized from acetone-hexane and acetone, respectively, yielding the 15β-hydroxy steroid of this example, M.P. 240–241° dec., $[\alpha]_D^{25}+103°$ (ethanol)

$\lambda_{max.}^{methanol}$ 242 mμ (E=16,600), $\lambda_{max.}^{Nujol}$ 2.91μ, 5.83μ, 6.01 and 6.18μ

The melting point of the compound of this example may vary from ranges of 261–220° dec. to 253–255° dec. indicating polymorphic variation.

EXAMPLE 2

*4-pregnene-15β,17α,21-triol-3,20-dione 21-acetate*

To a solution of 130 mg. of the compound of Example 1 in 4 ml. of pyridine is added 44 mg. of acetic anhydride. The reaction mixture is allowed to stand for 2 to 3 hours whereupon it is poured into water and the precipitate removed by filtration. The crude acetate is recrystallized from acetone-hexane, M.P. 244–246° dec., $[\alpha]_D^{25}+92$ (ethanol)

$\lambda_{max.}^{ethanol}$ 242 mμ (E=17,700), $\lambda_{max.}^{Nujol}$ 2.86 and 2.96μ, 5.72, 5.77, 5.82μ, 6.06, 6.20 and 8.10μ

EXAMPLE 3

*4-pregnene-15β,17α,21-triol-3,20-dione 15,21-diacetate*

A solution of 260 mg. of the compound obtained in Example 1 in 6 ml. of pyridine is treated with 3 ml. of acetic anhydride and allowed to stand overnight at room temperature. The reaction mixture is diluted with water and the precipitate so obtained by filtration is recrystallized from acetone-hexane. Recrystallization is preferably carried out by slow concentration of the solvent with the first crop of crystals consisting primarily of the mono-21-acetate and the diacetate of this example crystallizing from later crops, M.P. 193–197°. Recrystallization from acetone-hexane yields the pure diacetate of this example, M.P. 202–207°, $[\alpha]_D^{25}+54°$ (ethanol).

EXAMPLE 4

*1,4-pregnadiene-15β,17α,21-triol-3,20-dione*

*Bacillus sphaericus* (A.T.C.C. 7055) is incubated on a nutrient agar (composed of Bacto-beef extract, 3 g.; Bacto-peptone, 5 g.; sodium chloride, 8 g.; agar, 15 g.; tap water, 1 liter) for 24 hours at 28°.

To 100 ml. of a sterile nutrient broth (composed of Bacto-beef extract, 3 g.; Bacto-peptone, 5 g.; per liter of tap water) in a 300 ml. flask is added 1 ml. of the incubated culture and the broth mixture is further incubated for 24 hours at 28°, on a shaking machine. The broth culture so obtained is employed as an inoculum..

Into each of 10 flasks containing 100 ml. of sterile nutrient broth is added 1 ml. of the inoculum. The flasks are agitated on a rotary shaker for 8 hours at 28° at 240 strokes per minute. At the end of this growth period, a solution of 25 mg. of the compound of Example 1 in 0.5 ml. of ethanol is aseptically added to each flask which, in turn, is reshaken and incubated for an additional 24 hours.

The contents of the flasks are then combined and extracted three times with 2 liters of chloroform per extraction. The combined chloroform extracts are evaporated to dryness and the residue is recrystallized from acetone yielding the pregnadiene of this example.

EXAMPLE 5

*4-pregnene-11β,15β,17α,21-tetrol-3,20-dione*

By substituting 4-pregnene-11β,17α,21-triol-3,20-dione, milligram for milligram, in the procedure of Example 1, there is obtained the 15β-hydroxy compound of this example. Purification is effected by recrystallization from acetone. The respective 21-acetate and 15,21-diacetate of the compound of this example are prepared according to the analogous procedures of Examples 2 and 3. The esters are preferentially purified by recrystallization from acetone-hexane. Similarly, by substituting propionic anhydride in the esterification procedures yields the corresponding propionates.

EXAMPLE 6

*1,4-pregnadiene-11β,15β,17α,21-tetrol-3,20-dione*

By fermenting the compound of Example 5 with *Bacillus sphaericus* according to the procedure described in Example 4, or with *Corynebacterium simplex* (A.T.C.C. 6946), as described in Belgian Patent No. 540,478, yields the compounds of this example. Selective esterification forming the 21-acetate or 15,21-diacetate is effected as described in the preceding examples.

In similar fashion, by substituting the appropriate substrate in the procedure of Example 1, there is obtained 4-pregnene-11α,15β,17α,21-tetrol-3,20-dione and 4-pregnene-15β,17α,21-triol-3,11,20-trione, which are purified by recrystallization from acetone. The respective 21-acetates and 15,21-diacetates are prepared as heretofore described.

Subjecting the above 15β-hydroxy compounds to the microbiological action of *Bacillus sphaericus,* according to the procedure of Example 4, yields 1,4-pregnadiene-11α, 15β,17α,21-tetrol-3,20-dione and 1,4-pregnadiene-15β, 17α, 21-triol-3,11,20-trione, respectively. Conversion to the corresponding 21- and 15,21-diacetates is effected as described in the preceding examples.

We claim:

1. A compound selected from the group consisting of pregnadienes having the following structure:

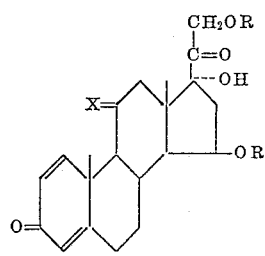

wherein R is a member selected from the group consisting of H and lower alkanoic acid radicals; X is a member selected from the group consisting of $H_2$, (H, αOH), (H, βOH) and O; and wherein R at C position 21 is lower alkanoic acid when R at C position 15 is a lower alkanoic acid.

2. 1,4-pregnadiene-11β,15β,17α,21-tetrol-3,20-dione.
3. 1,4-pregnadiene-15β,17α,21-triol-3,11,20-trione.
4. 1,4-pregnadiene-11β,15β,17α,21-tetrol-3,20-trione 21-acetate.
5. 1,4-pregnadiene-15β,17α,21-triol-3,11,20-trione 21-acetate.
6. 1,4-pregnadiene-15β,17α,21-triol-3,20-dione.

References Cited in the file of this patent

UNITED STATES PATENTS

| | | |
|---|---|---|
| 2,602,769 | Murray | July 8, 1952 |
| 2,658,023 | Shull | Nov. 3, 1953 |
| 2,695,907 | Murray et al. | Nov. 30, 1954 |
| 2,703,806 | Murray | Mar. 8, 1955 |
| 2,774,775 | Korman et al. | Dec. 18, 1956 |
| 2,783,226 | Gould et al. | Feb. 26, 1957 |
| 2,889,255 | Murray et al. | June 2, 1959 |

OTHER REFERENCES

"Prog. in Horm. Research," vol. XI—page 181, August 10, 1955.

"Chemistry and Industry," Bernstein et al., February 4, 1956, pages 111–112 relied on.

Helv. Chim Acta, vol. 39 pp. 375–377 (1956).